(12) United States Patent
Van Acker et al.

(10) Patent No.: US 12,000,438 B2
(45) Date of Patent: Jun. 4, 2024

(54) METHOD AND APPARATUS FOR CONTROLLING A LUBRICANT FLOW RATE

(71) Applicant: Dana Belgium N.V., Bruges (BE)

(72) Inventors: Tommy Van Acker, Bruges (BE); Joachim Van Dingenen, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 154 days.

(21) Appl. No.: 17/644,772

(22) Filed: Dec. 16, 2021

(65) Prior Publication Data

US 2022/0196082 A1 Jun. 23, 2022

(30) Foreign Application Priority Data

Dec. 18, 2020 (DE) ...................... 10 2020 216 302.2

(51) Int. Cl.
*F16D 13/74* (2006.01)
*F16D 13/72* (2006.01)

(52) U.S. Cl.
CPC ............. *F16D 13/74* (2013.01); *F16D 13/72* (2013.01)

(58) Field of Classification Search
CPC ........... F16D 13/00–76; F16D 2500/00–30407
See application file for complete search history.

(56) References Cited

U.S. PATENT DOCUMENTS

| | | | | |
|---|---|---|---|---|
| 11,530,725 | B1* | 12/2022 | Mahmud | F16D 13/74 |
| 2006/0194672 | A1* | 8/2006 | Ochi | F16H 61/0021 |
| | | | | 477/76 |
| 2009/0082156 | A1* | 3/2009 | Senoo | F16D 48/06 |
| | | | | 701/52 |
| 2015/0323395 | A1* | 11/2015 | Kawakami | G01N 25/18 |
| | | | | 702/130 |

FOREIGN PATENT DOCUMENTS

CN 113515156 A * 10/2021
DE 102015206614 A1 * 10/2016

* cited by examiner

*Primary Examiner* — Ernesto A Suarez
*Assistant Examiner* — Lillian T Nguyen
(74) *Attorney, Agent, or Firm* — McCoy Russell LLP (57) ABSTRACT

The present disclosure relates to a method and an apparatus for controlling a lubricant flow rate in a wet clutch. The method comprising: determining a clutch state as an open state, a closed state or a slipping state; determining a clutch temperature and a sump lubricant temperature; based at least on the clutch state, the clutch temperature and the sump lubricant temperature, selecting one out of a plurality of maps, wherein each map maps one or more operating parameters of the clutch on a target lubricant flow rate; determining a target lubricant flow rate based on the one or more operating parameters according to the selected map; and controlling a lubricant flow control device based on the determined target lubricant flow rate.

16 Claims, 5 Drawing Sheets

METHOD AND APPARATUS FOR CONTROLLING A LUBRICANT FLOW RATE

CROSS-REFERENCE TO RELATED APPLICATION

The present application claims priority to German Patent Application No. 10 2020 216 302.2, entitled "METHOD AND APPARATUS FOR CONTROLLING A LUBRICANT FLOW RATE" and filed on Dec. 18, 2020. The entire contents of the above-listed application is hereby incorporated by reference for all purposes.

TECHNICAL FIELD

The present disclosure relates to a method of controlling a lubricant flow rate for a wet clutch and an apparatus for controlling a lubricant flow rate for a plurality of wet clutches, such as for wet clutches in off-highway vehicles.

BACKGROUND AND SUMMARY

In wet clutches the clutch plates (also referred to as clutch discs) may be frictionally engaged. This friction generates heat and excessive heat may cause premature clutch degradation. For this reason, cooled lubricating oil flowing through a wet clutch assembly may also be used for cooling the clutch assembly. The cooling oil may flow through the wet clutch continuously while it is engaged. However, energy may be wasted when cooling oil flow is continued beyond the time when the excess heat has been removed from the clutch.

Another source of energy loss in a disengaged friction clutch constitutes clutch plates touching. In extreme cases this is caused by a phenomenon called clutch flutter and can lead to degradation. Flutter is a gyroscopic imbalance that can occur when clutch plates (separator plates and friction plates) rotate at opposite high speeds.

An object of the present disclosure is therefore to provide a method of controlling a lubricant flow rate for a wet clutch such that an overall efficiency of the clutch is improved. A further object of the present disclosure is to provide a method of controlling a lubricant flow rate for a wet clutch that improves a cooling capacity of the wet clutch and avoids clutch flutter. Yet another object of the present disclosure is to provide an apparatus for controlling a lubricant flow rate for a plurality of wet clutches.

The above mentioned objects are achieved by a method for controlling a lubricant flow rate for a wet clutch (in the following also denoted as clutch) according to the present disclosure comprises determining a clutch state as an open state, a closed state, or a slipping state; determining a clutch temperature and a sump lubricant temperature; based at least on the clutch state, the clutch temperature and the sump lubricant temperature, selecting one out of a plurality of maps, wherein each map maps one or more operating parameters of the clutch on a target lubricant flow rate; determining a target lubricant flow rate based on the one or more operating parameters according to the selected map, and controlling a lubricant flow control device based on the determined target lubricant flow rate.

The method may be executed in conjunction with an apparatus for controlling a lubricant flow rate, the apparatus comprising a lubricant volume pump for supplying lubricant to the plurality of wet clutches, a plurality of lubricant flow control devices for controlling the lubricant flow rate for the plurality of wet clutches, and a control unit for controlling the lubricant volume pump and the plurality of lubricant flow control devices. Advantageous embodiments of the method and the apparatus according to the present disclosure are mentioned in the dependent claims.

In the present application, the lubricant can be any appropriate lubrication medium. For instance, the lubricant comprises or consists of oil. Moreover, in the present application, the term "flow" and "flow rate" are sometimes interchangeably used. The term "clutch open state" denotes in the present application a state of a clutch where the clutch is completely disengaged, i.e. that no power is transferred between a hub and a drum of the clutch. The hub and drum of the clutch basically denote two parts or part groups that can be engaged to or disengaged from one another and between which part or part groups rotation energy can be transferred. In case each of the hub and drum denote part groups, the hub and drum each may comprise a plurality of plates which are configured to alternatingly engage to one another. The plates connected to the hub may have inner splines. The plates connected to the drum may have outer splines. For example, the inner spline plates may be "friction plates" and the outer spline plates may be "separator plates". Alternatively the inner spline plates may be "separator plates" and the outer spline plates may be "friction plates". The term clutch slipping state denotes in the present application a state of the clutch where the drum and the hub, for instance the friction plates and the separator plates, of the clutch are in contact with one another, but rotate at different speeds such that a significant amount of the transferred power results in friction losses. The term "clutch closed state" denotes in the present application a state of the clutch where the clutch is completely engaged, i.e. that the drum and the hub, or rather the separator plates and the friction plates, are in full connection with one another and rotate at equal speeds, and torque is transferred between the drum and the hub and friction losses are minimized. The clutch temperature denotes a current temperature of the clutch. The sump lubricant temperature denotes, in the present application, a current temperature of lubricant in a lubricant sump in connection with the clutch.

The present disclosure enables to selectively control the lubricant flow rate in a wet clutch depending on the clutch state, such that the lubricant flow rate can be optimized for each clutch state. This in turn enables to selectively improve cooling in the clutch slipping and closed state. Additionally, the present disclosure enables to continuously control the lubricant flow rate based on a variety of other parameters which additionally improves efficiency in all clutch states (open, slipping and closed), and also avoids failure due to clutch flutter in a clutch open state.

According to an embodiment of the present disclosure the clutch state may be determined based on a hub speed, a hub rotation direction, a drum speed, a drum rotation direction, a friction plate speed, a separator plate speed, a clutch actuation pressure and/or a clutch torque. The hub and drum speed in the present application basically equal a rotational friction plate speed or separator plate speed, whichever may be respectively connected to a hub and a drum. The clutch actuation pressure denotes in the present application a pressure that is desired to engage the clutch and thus transfer torque through the clutch.

According to a further embodiment of the present disclosure the operating parameters may comprise the hub speed, the drum speed, the friction plate speed, the separator plate speed, the sump lubricant temperature, the clutch state, the clutch lubricant temperature, a clutch temperature and/or a heat convection. The clutch lubricant temperature denotes in the present application a current temperature of an amount of lubricant flowing through the clutch.

According to a further embodiment of the present disclosure the clutch temperature and/or the clutch lubricant temperature may be determined based on a slipping power, the sump lubricant temperature and a current lubricant flow rate. The slipping power denotes in this application a power that is delivered by the clutch due to drag between the drum plates and the hub plates during the process of engagement or disengagement of the drum and hub plates.

According to a further embodiment of the present disclosure the slipping power may be determined based on the hub speed, the drum speed, the friction plate speed, the separator plate speed, the clutch actuation pressure and/or the clutch torque.

According to a further embodiment of the present disclosure the selecting of one out of a plurality of maps may be further based on a comparison between the clutch temperature and the sump lubricant temperature.

According to a further embodiment of the present disclosure the plurality of maps may at least include one or more clutch pumping capacity maps, one or more clutch efficiency/flutter maps and one or more splash lube maps.

According to a further embodiment of the present disclosure a hub of a vehicle may be drivingly connected with a plurality of friction plates of the wet clutch such that the hub speed is basically equal to the friction plate speed and a drum of a vehicle is drivingly connected to a plurality of separator plates such that the drum speed is basically equal to the separator plate speed. Alternatively, a drum of a vehicle may be drivingly connected with a plurality of friction plates of the wet clutch such that the drum speed is basically equal to the friction plate speed and a hub of a vehicle is drivingly connected to a plurality of separator plates such that the hub speed is basically equal to the separator plate speed.

According to a further embodiment of the present disclosure, the method may further comprise: detecting a lubricant overtemperature when the clutch lubricant temperature exceeds a threshold value, and adjusting the target lubricant flow rate in order to reduce the clutch lubricant temperature below the threshold value.

The present disclosure further includes a method of controlling a lubricant flow rate for a plurality of wet clutches, wherein one or more lubricant flow control devices are controlled individually according to the method described above.

The present disclosure further includes an apparatus for controlling a lubricant flow rate for a plurality of wet clutches, the apparatus comprising a lubricant volume pump for supplying lubricant to the plurality of wet clutches, a plurality of lubricant flow control devices for controlling the lubricant flow for the plurality of wet clutches, a control unit for controlling the lubricant volume pump and the plurality of lubricant flow control devices according to the method described above.

BRIEF DESCRIPTION OF THE FIGURES

In the following, some embodiments of the method and the apparatus according to the present disclosure are described in more detail on the basis of the following figures. The described features are not only conceivable in the combinations of the disclosed embodiments, but can be realized independently of the concrete embodiments in various other combinations. In the figures, equal or similar features are denoted by equal or similar reference signs.

DETAILED DESCRIPTION

Figure 1:
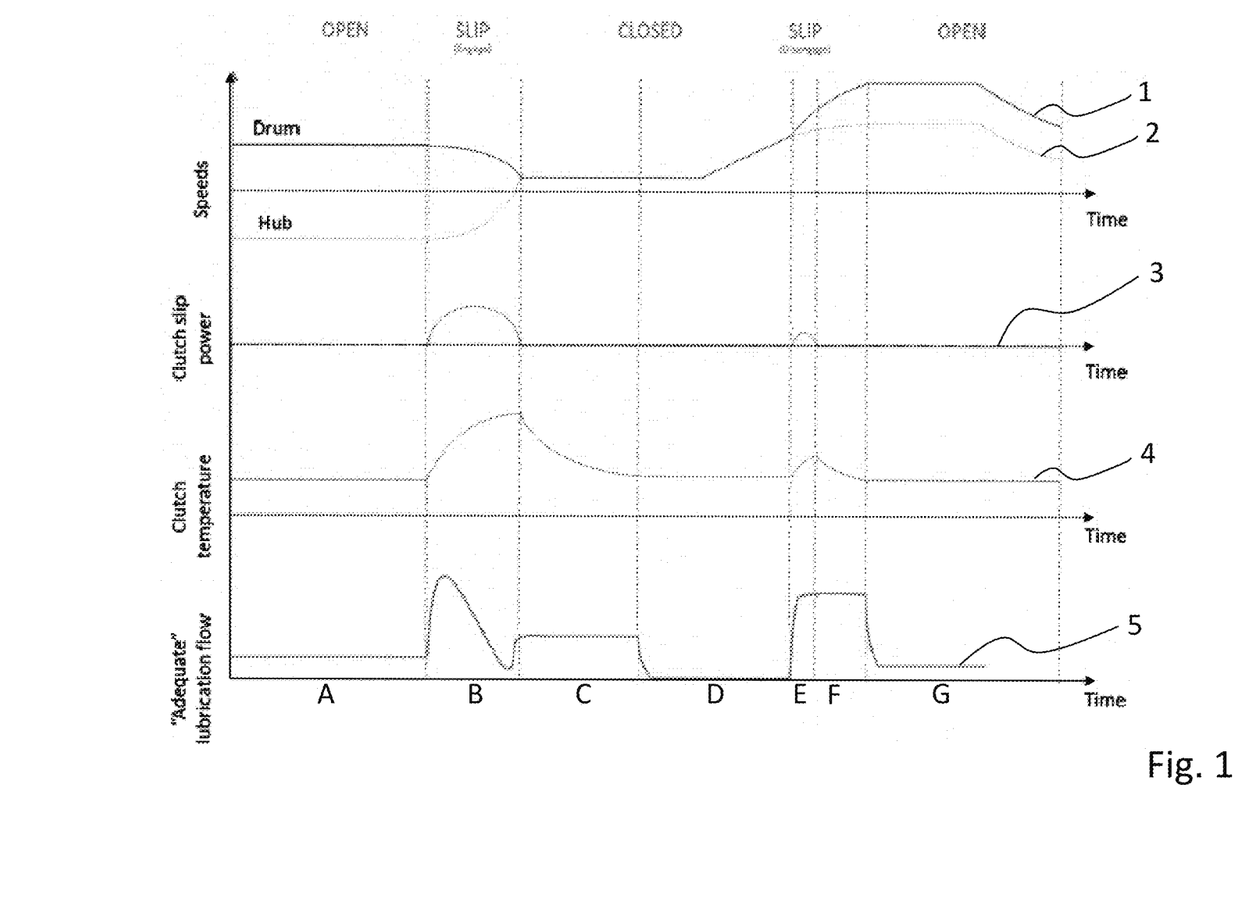
FIG. 1 shows a diagram illustrating a time behaviour of different parameters as well as of an adequate lubrication flow rate determined according to an embodiment of the present disclosure between two clutch open states.

FIG. 1 shows a diagram illustrating a time behaviour of different parameters between two clutch open states as well as of an adequate lubrication flow rate in each clutch state determined according to an embodiment of the present disclosure. In other words, the following description of the adequate lubrication flow rate in the different clutch states basically constitutes the result of the method according to the present disclosure. In the present application, the term adequate lubrication flow rate shall describe the optimally adjusted lubrication flow rate to ensure cooling and increase efficiency of the clutch or clutch system. In one example, adequate lubrication flow may correspond to a lubricant flow rate configured to mitigate a lubricant temperature from exceeding the threshold value.

Curves 1 and 2 in FIG. 1 illustrate the time behaviour of the drum and hub speed. Curve 3 illustrates the time behaviour of the clutch slip power. Curve 4 illustrates the time behaviour of the clutch temperature. Curve 5 illustrates the time behaviour of an adequate lubrication flow rate determined according to the method according to the present disclosure.

In the following description of embodiments, it is understood that the drum or drum part is drivingly connected with or comprises a plurality of separator plates, respectively. Moreover, it is understood that the hub or hub part is drivingly connected with or comprises a plurality of friction plates, respectively. However, the present disclosure is not limited to this configuration. Another configuration, where the hub or hub part is connected with or comprises separator plates, respectively, and the drum or drum part is connected with or comprises friction plates, respectively, is also covered by the present disclosure.

In one embodiment, the clutch lubrication flow rate may be controlled at a lower threshold rate to increase efficiency. The lower threshold rate may be based on a desired reduction in friction along with a threshold temperature of the lubricant/clutch being met. However, some conditions may result in the flow rate increasing above the lower threshold rate, wherein some conditions may include increased friction and blocking the separator plates from touching, including "flutter" when the clutch is disengaged, and when the clutch demands cooling. The shown parameters, which enter the calculation of the lower threshold rate (herein interchangeably referred to as an adequate lubrication flow rate), indicate when the exceptions occur.

Column A in FIG. 1 shows the time behaviour in a clutch open state. The drum part connected to a motor of a vehicle rotates at a higher constant rotational speed 1 than a constant rotational speed 2 of a hub part connected to the wheels of the vehicle. The clutch slip power 3 is zero since the drum and hub part are not in contact with one another. Only "drag losses" occur. The clutch temperature 4 is at a system temperature level, i.e. sump lubricant temperature. The adequate lubrication flow 5 is therefore set to a minimum value to improve efficiency, the minimum value, however, being high enough to ensure a fluid film that prevents touching plates and/or flutter. The exact values for the adequate lubrication flow rate can be learned from an efficiency/flutter map as will be explained with respect to FIGS. 3-5.

Column B in FIG. 1 shows a clutch slipping state when closing the clutch. The drum and hub parts engage with one another that results in a decrease in the drum speed 1 and an increase in the hub speed 2 until both speeds 1 and 2 are equal at the time the clutch is completely closed. The clutch slip power 3 rises to a threshold value, which may correspond to a maximum clutch slip power of the configuration, and drops down to zero again. The clutch temperature 4 also rises in the slip phase B and then decreases at the time the clutch is completely closed. The rise in the clutch slip power 3 and the clutch temperature 4 result from the increase in friction between the drum and hub part, i.e. friction and separator plates, during the process of engagement. Therefore, during slip phase B, the adequate lubrication flow rate 5 is set to a value limited by an upper limit value that can be provided by the clutch lube pump. The exact values for the adequate lubrication flow rate can be learned from clutch pumping capacity map as will be explained with respect to FIGS. 3-5. In this way, a lubricant-air mixture can be mitigated and cooling can be increased.

Column C in FIG. 1 shows a clutch closed state in which the drum speed 1 and the hub speed 2 are equal and constant. The clutch slip power 3 is zero, since in the closed state B basically no friction between the drum and hub part occurs. The clutch temperature 4 gradually decreases, as a result of the adequate cooling lubrication flow rate learned from the clutch pumping capacity map, until the clutch temperature 4 reaches a nominal working sump lubricant temperature, wherein the nominal working sump lubricant temperature is a temperature within a desired operating range. However, as long as the clutch temperature 4 is higher than the nominal working sump lubricant temperature, the adequate lubrication flow rate is set to the adequate cooling lubrication flow rate learned from the clutch pumping capacity map, which is the upper limit value that the clutch plates can pump without creating a lubricant-air mixture.

Column D illustrates a speed increase of the drum and hub part in the closed state. The clutch slip power 3 is still zero. The clutch temperature 4 has dropped to the nominal working sump lubricant temperature. No friction between the engaged drum and hub part occurs. The adequate lubrication flow rate 5 is set to an absolute minimum value. In other words, unless splash lubrication is desired for surrounding components, the adequate lubrication flow rate 5 is set to zero. The exact values for the adequate lubrication flow rate can be learned from a splash lube map as will be explained with respect to FIGS. 3-5.

Column E of FIG. 1 shows a further clutch slipping state during the process of opening the clutch. The drum speed 1 and the hub speed 2 are further increased. However, since the drum part is gradually disengaged from the hub part, a smaller amount of rotational power is transferred from the drum part to the hub part which results in a bigger increase in the drum speed 2 and a smaller increase in the hub speed 1. In the clutch slipping state E, friction occurs between the drum part and the hub part until the clutch actuation pressure is gone similar as in column B resulting in a raise in the clutch slip power 3 which drops towards the end of the slipping phase when the drum and the hub part are completely disengaged from one another. The friction leads to an increase of the clutch temperature 4 which continues to increase until the end of the slipping phase. In the clutch slip state E the adequate lubrication flow rate 5 is set to a value, limited by the upper limit value that can be provided by the clutch lube pump. The exact values for the adequate lubrication flow rate can be learned from a clutch pumping capacity map as will be explained with respect to FIGS. 3-5. In this way, a lubricant-air mixture can be prevented and cooling can be maximized.

Column F of FIG. 1 shows a clutch open state were only efficiency power losses occur. To reduce the clutch temperature to the level of the sump lubricant temperature, the adequate lubrication flow rate can be learned from a clutch pumping capacity map as will be explained with respect to FIGS. 3-5.

Column G shows another clutch open state. The clutch slip power 3 is zero, since hub and drum part are completely disengaged. Only "drag losses" occur. The clutch temperature 4 is at the system temperature level, i.e. the sump lubricant temperature. The adequate lubrication flow 5 is therefore set to a minimum value to improve efficiency, the minimum value, however, being high enough to ensure a fluid film that prevents touching plates and/or flutter. The exact values for the adequate lubrication flow rate can be learned from an efficiency/flutter map as will be explained with respect to FIGS. 3-5.

Figure 2:
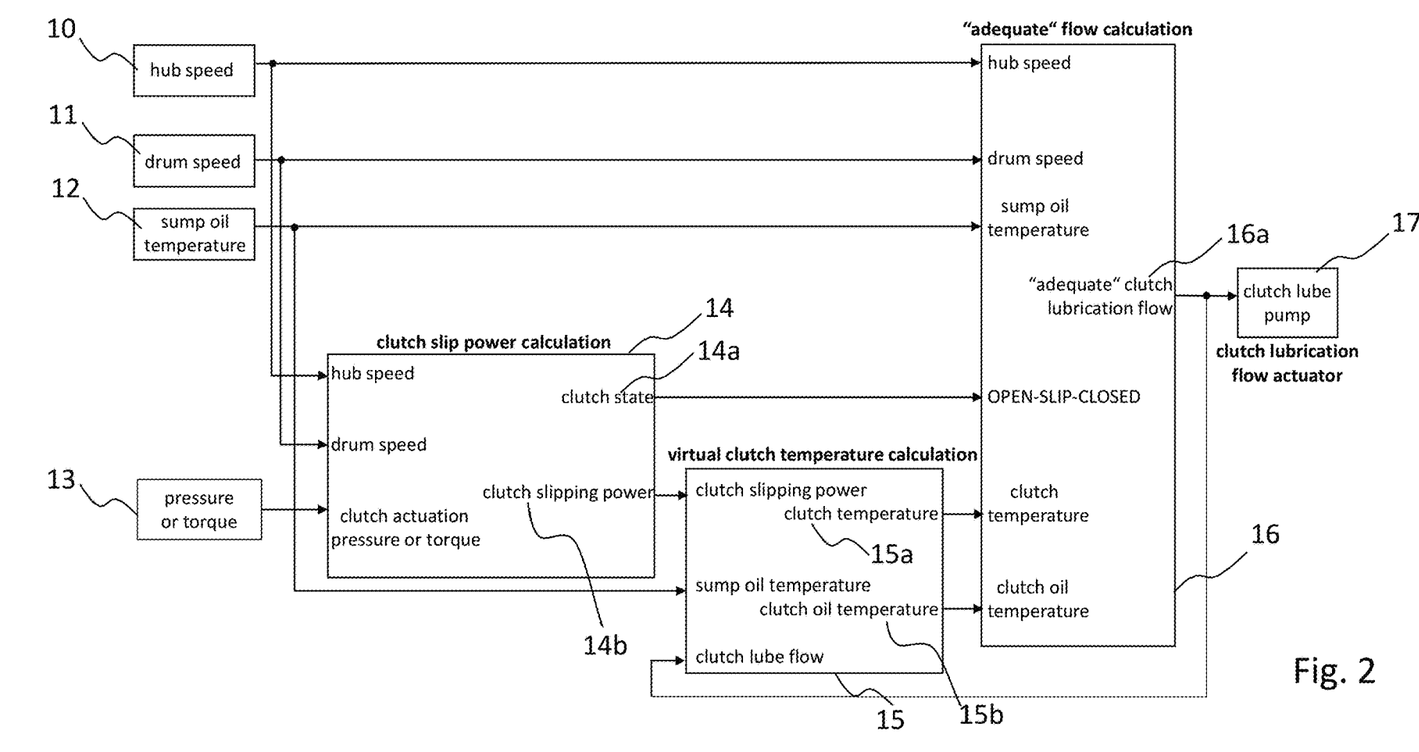
FIG. 2 shows a flowchart illustrating the process for calculating operating parameters of the clutch and a resulting adequate lubrication flow rate according to an embodiment of the present disclosure.

FIG. 2 shows a flowchart illustrating the process for calculating operating parameters of the clutch and the adequate lubrication flow rate according to an embodiment of the present disclosure based on four measured variables. As an example, lubricating oil is employed as a lubricant here. The four basic directly or indirectly measured parameters are the hub speed 10, the drum speed 11, the sump oil temperature 12 and the clutch actuation pressure or clutch torque 13. The calculation shown in FIG. 2 is further based on the clutch dimensions and the physical properties of the lubricating oil. The hub speed 10, the drum speed 11 and the clutch actuation pressure or torque enter the clutch slip power calculation 14. The clutch slip power calculation 14 outputs the clutch state 14a and the clutch slipping power 14b. The clutch slipping power 14b, the sump oil temperature 12 enter the virtual clutch temperature calculation 15. In addition, also the current adequate clutch lubrication flow rate 16a enters the virtual clutch temperature calculation 15. The virtual clutch temperature calculation 15 outputs the clutch temperature 15a and the clutch oil temperature 15b. The operating parameters which are the hub speed 10, the drum speed 11, the sump oil temperature 12, the clutch state 14a, the clutch temperature 15a and the clutch oil temperature 15b finally enter the adequate lubrication flow calculation 16. The adequate lubrication flow calculation 16 outputs the adequate clutch lubrication flow rate 16a to the clutch lube pump (clutch lubrication actuator) 17 and to the virtual clutch temperature calculation 15. The whole adequate lubrication flow calculation is repeated and the adequate lubrication flow rate is updated in real time (electronic controller cycle time). The adequate lubrication flow rate calculation 16 is carried out on the basis of different parameter maps comprising predefined multidimensional mappings as explained with respect to FIGS. 3 to 5.

The clutch oil temperature calculation is also used to correct the oil flow in the event of clutch oil overtemperature, mitigating oil degradation.

Figure 6:
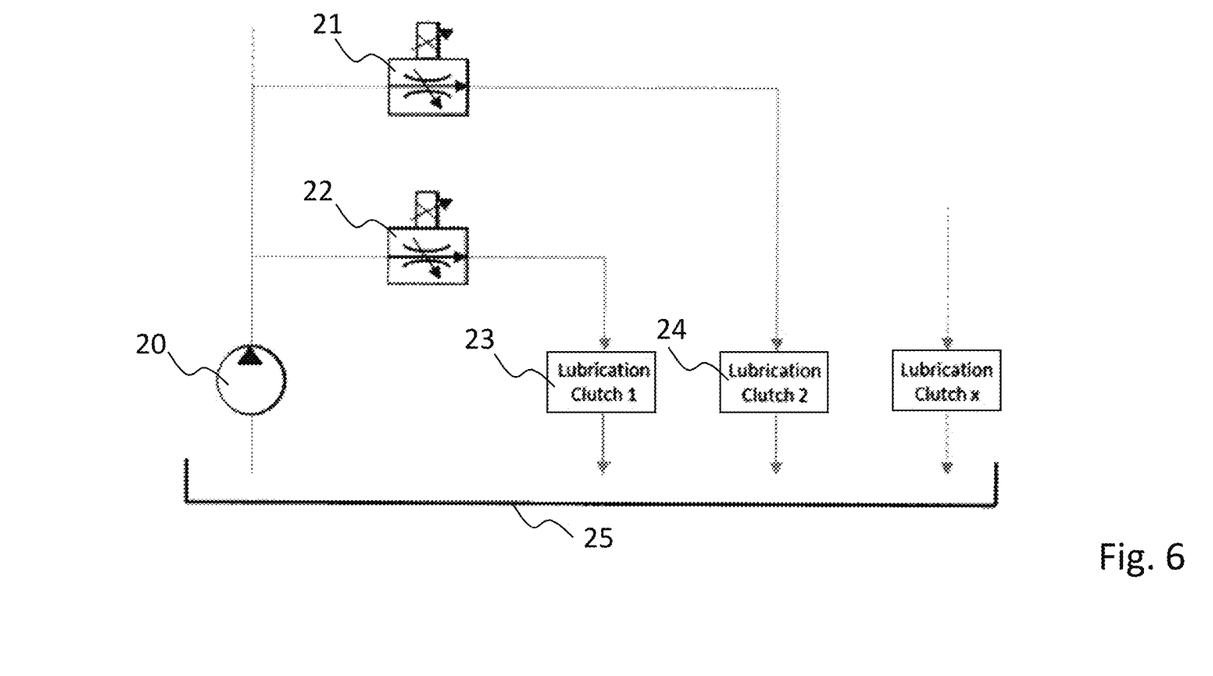
FIG. 6 shows a lubrication pump system for a plurality of wet clutches according to an embodiment of the present disclosure.

In one example, a plurality of sensors may be used to measure each of the above described parameters. For example, a hub speed sensor may sense the hub speed 10. A drum speed sensor may sense the drum speed 11. A sump temperature sensor may sense the sump oil temperature 12. A clutch torque/actuation sensor may be sensed via a pressure sensor or a torque sensor. The sensors 44 may provide feedback to a controller 42 of a control system 40 as shown in FIG. 6. The controller 42 may include memory with instructions stored thereon that cause the controller to execute one or more actions, thereby adjusting operation of one or more actuators 46. In one example, the sensors 44 may sense a change in hub speed 10, drum speed 11, sump oil temperature 12, and/or clutch pressure or torque 13 and the controller 42 may signal to actuators of the lubricant pump 20 and/or the lubricant valves 21 and 22 to adjust a lubricant flow rate to corresponding clutches.

Figure 3:
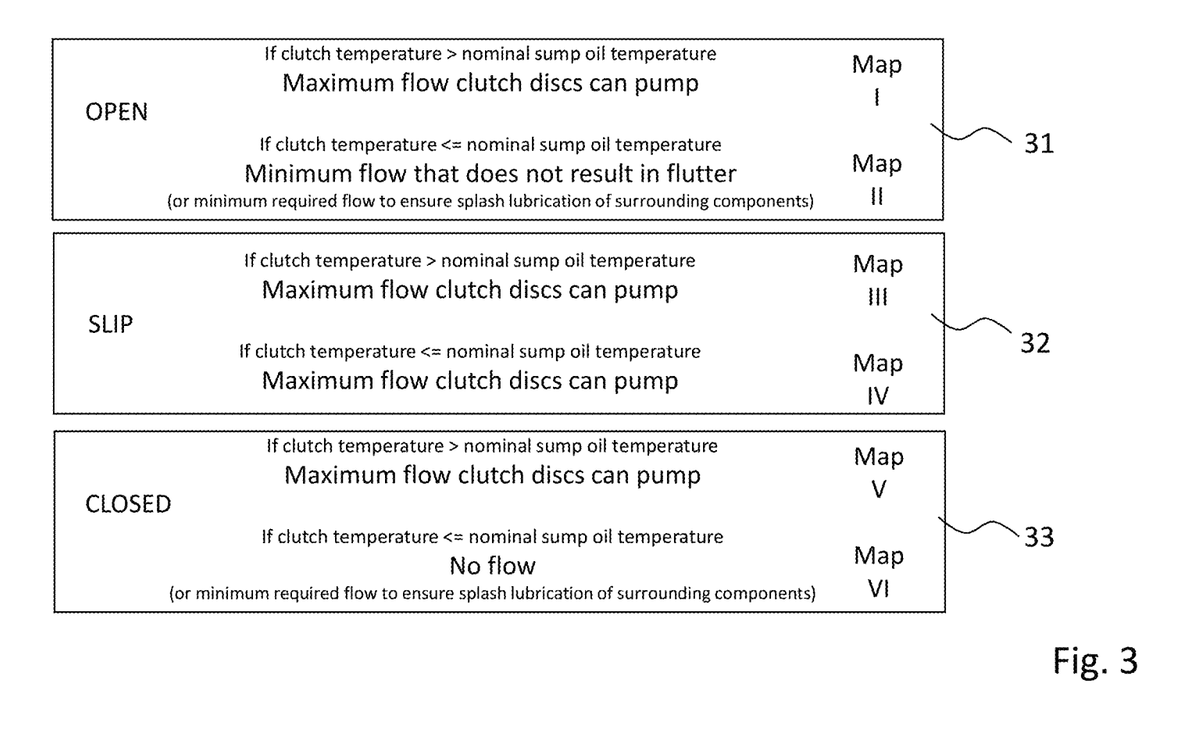
FIG. 3 shows a schematic overview of how to select an appropriate map for obtaining an adequate lubrication flow rate according to an embodiment of the present disclosure.
Figure 5:
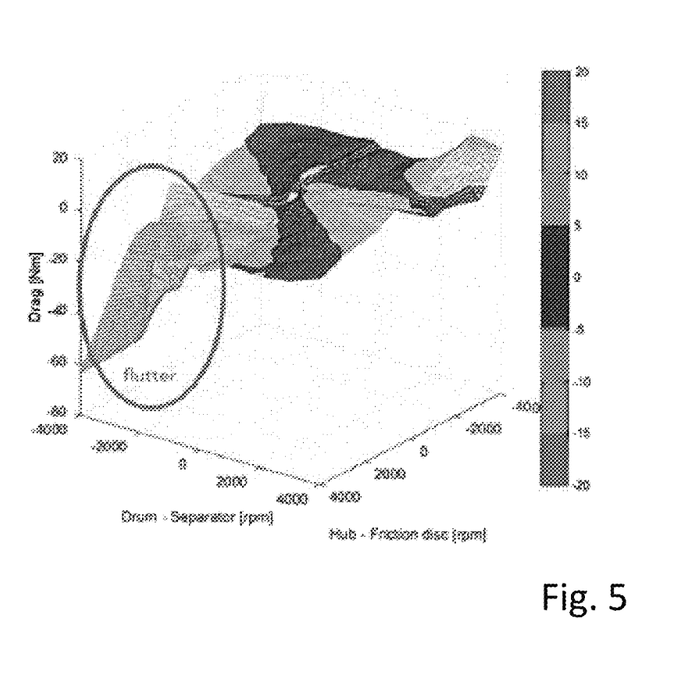
FIG. 5 shows an efficiency/flutter map according to an embodiment of the present disclosure.

FIG. 3 shows a schematic overview of selecting an appropriate map for obtaining an adequate lubrication flow rate according to an embodiment of the present disclosure. More precisely, the controller may select one map of a plurality of maps based on data received from the plurality of sensors. In this embodiment, there are six maps, namely four different clutch pumping maps which are denoted by map I, map III, map IV and map V (example of FIG. 5), a clutch efficiency/flutter map denoted by map II (example of FIG. 4) and two splash lube maps denoted by map II and map VI, wherein map II is identical to the clutch efficiency/flutter map. The maps contain values obtained via testing or simulation. The selection of the appropriate map, from which the adequate lubrication flow rate can be extracted, is carried out at least on the basis of the clutch state (open, slipping, closed) and the relation between the clutch temperature and the sump oil temperature. The selection is carried out as follows:

If the clutch is in an open state 31 and if the clutch temperature is greater than the nominal sump oil temperature, the clutch lubrication actuator is set to provide the upper limit value of flow the clutch plates can pump without creating an oil-air mixture according to map I (example of FIG. 5).

If the clutch is in an open state 31 and if the clutch temperature is less than or equal to the nominal sump oil temperature, the lower threshold rate of flow that does not result in touching plates or flutter (or the minimum desired flow to ensure splash lubrication of surrounding components) is set according to map II.

If the clutch is in a slip state 32 and if the clutch temperature is greater than the nominal sump oil temperature, the upper limit value of flow the clutch plates can pump is set according to map III, as selected by the controller 42.

If the clutch is in a slip state 32 and if the clutch temperature is greater than the nominal sump oil temperature, the clutch lubrication actuator is set to provide the upper limit value of flow the clutch plates can pump without creating an oil-air mixture according to map IV.

If the clutch is in a closed state 33 and if the clutch temperature is less than or equal to the nominal sump oil temperature, the upper limit value of flow the clutch plates can pump is set according to map V.

If the clutch is in a closed state 33 and if the clutch temperature is less than or equal to the nominal sump oil temperature, the clutch lubrication actuator is set to provide no flow or the minimum desired flow to promote splash lubrication of surrounding components according to map VI.

For instance, each map maps three operating parameters to the adequate lubrication flow rate. The three operating parameters may be the hub speed, the drum speed and the sump oil temperature. Alternatively, less or more operating parameters such as heat convection can be used. In other words, the maps constitute a four- or multidimensional-look-up table from which the adequate lubrication flow rate may be extracted. Alternatively, less or more operating parameters can be used.

Figure 4:
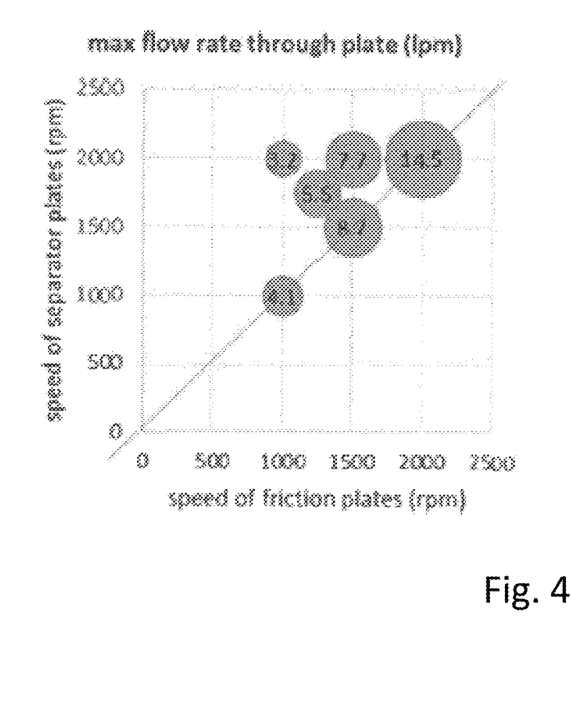
FIG. 4 shows a maximum flow rate map according to an embodiment of the present disclosure.

FIG. 4 shows an example of a maximum flow rate map according to an embodiment of the present disclosure. The maximum flow rate map is a three-dimensional diagram showing a maximum lubrication flow rate through the plates depending on the separator speed (drum in this example) and friction speed (hub in this example) at a given sump oil temperature. A map is available for each relevant operating sump oil temperature, making this a four-dimensional lookup table.

FIG. 5 shows an example of an efficiency/flutter map according to an embodiment of the present disclosure. The efficiency/flutter map is a three-dimensional diagram that shows a drag torque of the clutch depending on the separator plate speed (drum speed in this example) and the friction plate speed (hub speed in this example) at a given clutch lubrication flow. A map is available for the relevant clutch lubrication flows, making this a four-dimensional lookup table. Alternatively, less or more operating parameters, such as sump oil temperature, may be used. Since this map describes a clutch open state typically the drag torque values are low, with the exception when the clutch lubrication flow becomes too low and a risk for the plates to touch or flutter rises. In such an event the clutch lubrication flow will be raised to avoid clutch failure.

FIG. 6 shows a lubrication pump system for a plurality of wet clutches according to an embodiment of the present disclosure. The lubrication pump system comprises a pump 20 which may be a fixed or variable volume pump that sucks a lubricant (e.g. oil) from a transmission lubricant sump 25. The lubrication pump system further comprises a plurality of proportional flow control valves 21 and 22 respectively providing the lubricant for the individual clutches 23 and 24. The lubrication flow for each lubrication clutch 23 and 24 is controlled individually. The lubricant is forced through the clutches 23 and 24 and collected in the transmission lubricant sump 25. Besides the parts shown in FIG. 6, other elements are included in the lubrication pump system to ensure safety and efficiency of the lubrication system.

FIG. 6 further includes the control system 40 comprising the controller 42. Controller 42 may comprise a portion of a control system 40. Control system 40 is shown receiving information from a plurality of sensors 44 (various examples of which are described in FIG. 3) and sending control signals to a plurality of actuators 46, which may include actuators of the pump 20 and the flow control valves 21 and 22. The controller may receive input data from the various sensors, process the input data, and trigger the actuators in response to the processed input data based on instruction or code programmed therein corresponding to one or more routines. The controller 42 receives signals from the various sensors of FIG. 3 and employs the various actuators of FIG. 6 to adjust operation based on the received signals and instructions stored on a memory of the controller.

As illustrated in FIG. 6, a number of valves may be equal to a number of clutches. Each valve of the valves may control lubricant flow to each clutch of the clutches such that a desired lubricant flow rate to each clutch is achieved. In this way, energy consumption may be reduced while a remaining-useful-life (RUL) of the clutches is increased. In one example, the controller may adjust one or more of the plurality of valves to a desired position including a fully closed position, a fully open position, or a position therebetween. The fully closed position may correspond to a no flow position (e.g., 0% flow). The fully open position may correspond to a maximum flow position (e.g., 100% flow). The positions therebetween may include more closed and more open positions, wherein more open positions may flow a greater amount of lubricant than a previous position. Thus, more closed positions may flow a lower amount of lubricant than a previous position. By adjusting a position of one or more of the flow control devices, a target lubricant flow value may be realized in combination with control of the pump.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a lubricant flow rate for a wet clutch, comprising:
   determining a clutch state as an open state, a closed state or a slipping state,
   determining a clutch temperature and a sump lubricant temperature,
   based at least on the clutch state, the clutch temperature and the sump lubricant temperature, selecting one out of a plurality of maps, wherein each map maps one or more operating parameters of the clutch on a target lubricant flow rate and the plurality of maps at least includes one or more clutch pumping capacity maps, one or more clutch efficiency/flutter maps, and one or more splash lube maps;
   determining the target lubricant flow rate based on the one or more operating parameters according to the selected map; and
   controlling a lubricant flow control device based on the determined target lubricant flow rate.

2. The method according to claim 1, wherein the clutch state is determined based on a hub speed, a drum speed, a friction plate speed, a separator plate speed, a clutch actuation pressure, and/or a clutch torque.

3. The method according to claim 1, wherein the operating parameters comprise a hub speed, a drum speed, a friction plate speed, a separator plate speed, the sump lubricant temperature, the clutch state, a clutch lubricant temperature, the clutch temperature, and/or a heat convection.

4. The method according to claim 3, wherein the clutch temperature and the clutch lubricant temperature are determined based on a slipping power, the sump lubricant temperature, and a lubricant flow rate.

5. The method according to claim 4, wherein the slipping power is determined based on the hub speed, the drum speed, the friction plate speed, the separator plate speed, the clutch actuation pressure, and/or the clutch torque.

6. The method according to claim 3, further comprising:
   detecting a lubricant overtemperature when the clutch lubricant temperature exceeds a threshold value, and
   adjusting the target lubricant flow rate in order to reduce the clutch lubricant temperature below the threshold value.

7. The method according to claim 1, wherein the selecting of one out of the plurality of maps is further based on a comparison between the clutch temperature and the sump lubricant temperature.

8. A system, comprising:
   a lubricant pump;
   a flow control device;
   a wet clutch; and
   a controller with instructions stored on memory thereof that cause the controller to:
      determine a target lubricant flow rate based on one or more of a clutch state, a clutch temperature, and a sump lubricant temperature and the target lubricant flow rate is equal to one of a lower threshold rate, an upper limit value based on a flow rate clutch plates pump without creating a lubricant-air mixture, or a flow rate therebetween.

9. The system of claim 8, wherein the lower threshold rate is based on a rate that blocks clutch plates from touching and reduces energy consumption.

10. The system of claim 8, wherein the target lubricant flow rate is equal to the upper limit value in response to one of the clutch states being open and a clutch temperature being greater than the sump lubricant temperature, the clutch state being a slip state, or the clutch state being closed and the clutch temperature being greater than the sump lubricant temperature.

11. The system of claim 10, wherein the target lubricant flow rate is equal to the upper limit value during the slip state in response independent of the clutch temperature.

12. The system of claim 10, wherein the target lubricant flow rate is equal to the lower threshold rate in response to the clutch state being open and the clutch temperature being less than or equal to the sump lubricant temperature.

13. The system of claim 10, wherein the target lubricant flow rate is equal to a no flow rate or the lower threshold rate in response to the clutch state being closed and the clutch temperature being less than or equal to the sump lubricant temperature.

14. A method, comprising:
controlling a position of one or more of a plurality of valves, each valve of the plurality of valves configured to adjust a lubricant flow rate to a corresponding wet clutch of a plurality of clutches based on a target lubricant flow rate, wherein the target lubricant flow rate is determined based on one or more of a clutch state, a clutch temperature, and a sump lubricant temperature according to a selected map of a plurality of maps, and the plurality of maps includes at least includes one or more clutch pumping capacity maps, one or more clutch efficiency/flutter maps, and one or more splash lube maps.

15. The method of claim 14, further comprising, in response to the clutch state being in a slip state, determining the target lubricant flow rate is equal to an upper limit value flow rate and adjusting the position to a more open or fully open position.

16. The method of claim 14, wherein the target lubricant flow rate is equal to one of a lower threshold rate, an upper limit value based on a flow rate clutch plates pump without creating a lubricant-air mixture, or a flow rate therebetween.

\* \* \* \* \*